(12) United States Patent  
Hunt

(10) Patent No.: US 7,977,646 B2
(45) Date of Patent: Jul. 12, 2011

(54) SCINTILLATION DETECTOR REFLECTOR

(75) Inventor: Jeffrey D. Hunt, Concord, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 101 days.

(21) Appl. No.: 12/425,485

(22) Filed: Apr. 17, 2009

(65) Prior Publication Data

US 2009/0261262 A1  Oct. 22, 2009

Related U.S. Application Data

(60) Provisional application No. 61/045,649, filed on Apr. 17, 2008.

(51) Int. Cl.
*G01T 1/20* (2006.01)

(52) U.S. Cl. .................................. 250/370.11

(58) Field of Classification Search ............. 250/361 R, 250/370.11; 156/60; 204/192.1
See application file for complete search history.

(56) References Cited

U.S. PATENT DOCUMENTS

| | | | |
|---|---|---|---|
| 4,658,141 A * | 4/1987 | Wilt et al. ................ | 250/361 R |
| 4,720,426 A * | 1/1988 | Englert et al. ............. | 428/344 |
| 4,764,677 A * | 8/1988 | Spurney ..................... | 250/361 R |
| 5,080,856 A * | 1/1992 | Grenier et al. ............. | 376/159 |
| 5,869,836 A | 2/1999 | Linden et al. | |
| 6,222,192 B1 | 4/2001 | Sekela et al. | |
| 6,359,282 B1 | 3/2002 | Sekela | |
| 6,362,479 B1 | 3/2002 | Andreaco et al. | |
| 6,389,096 B1 * | 5/2002 | Hoffman et al. ........... | 378/19 |
| 6,881,960 B2 | 4/2005 | Schreiner et al. | |
| 6,909,097 B2 | 6/2005 | Schreiner et al. | |
| 7,019,297 B2 * | 3/2006 | Aykac et al. ................ | 250/368 |
| 7,138,633 B1 | 11/2006 | Rozsa et al. | |
| 2002/0074502 A1 * | 6/2002 | Takabayashi et al. ...... | 250/368 |
| 2004/0159792 A1 * | 8/2004 | Andreaco et al. ......... | 250/363.03 |
| 2005/0104000 A1 * | 5/2005 | Kindem et al. ........... | 250/361 R |
| 2007/0007460 A1 | 1/2007 | Hochstetler et al. | |
| 2008/0179533 A1 * | 7/2008 | Nagata et al. ............. | 250/370.11 |
| 2009/0065700 A1 | 3/2009 | Menge et al. | |
| 2009/0101844 A1 * | 4/2009 | Ohbayashi ................. | 250/488.1 |
| 2009/0236534 A1 | 9/2009 | Selfe et al. | |
| 2009/0261262 A1 | 10/2009 | Hunt | |
| 2009/0294683 A1 | 12/2009 | Perna | |

OTHER PUBLICATIONS

U.S. Appl. No. 12/640,536, filed Dec. 17, 2009 with Preliminary Amendment, 33 pages.
U.S. Appl. No. 12/644,551, filed Dec. 22, 2009 with Preliminary Amendment, 27 pages.
zircarzirconia.com, "Alumina Fibers and Textiles, Type AL," Product Data, Bulletin #E-01, Jan. 2004, pp. 1-3.

* cited by examiner

*Primary Examiner* — David P Porta
*Assistant Examiner* — Marcus H Taningco
(74) *Attorney, Agent, or Firm* — Finch & Maloney PLLC

(57) ABSTRACT

A scintillation detector and system includes a scintillation crystal having a surface and a reflector surrounding at least a portion of the scintillation crystal. The reflector includes an organic substrate and an inorganic material fixed to the organic substrate, wherein at least a portion of the inorganic material contacts at least a portion of the crystal surface.

26 Claims, 5 Drawing Sheets

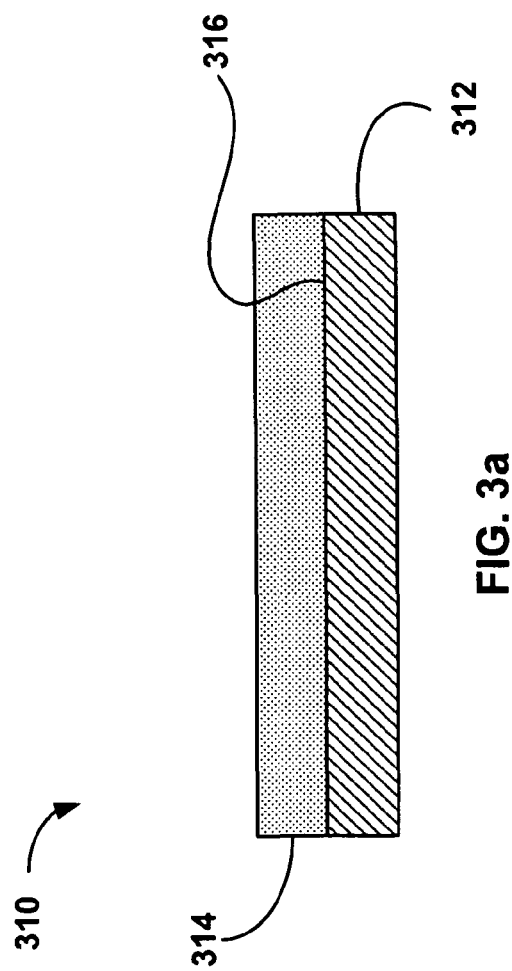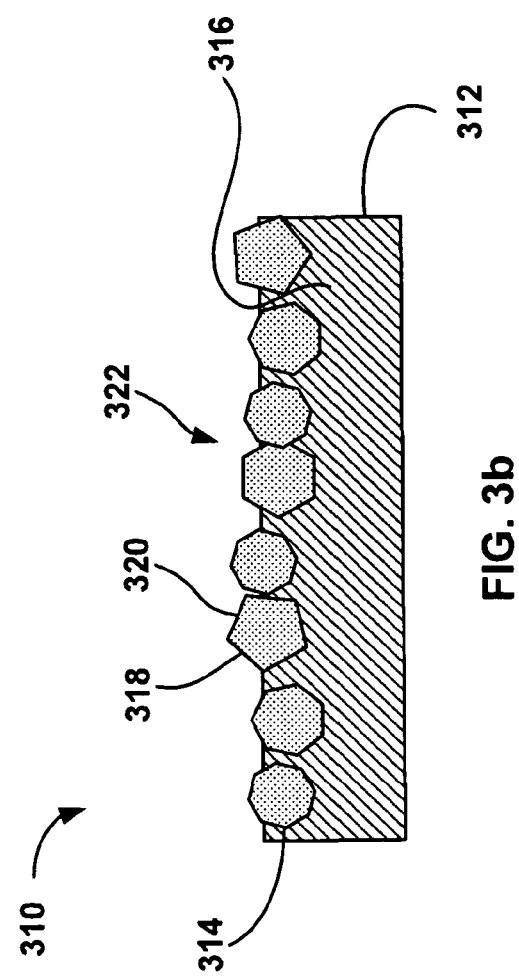

SCINTILLATION DETECTOR REFLECTOR

CROSS REFERENCES TO RELATED APPLICATIONS

The present application claims the benefit of the filing date of U.S. Provisional Application No. 61/045,649, filed on Apr. 17, 2008, the teachings of which are incorporated herein by reference.

FIELD OF THE INVENTION

The present disclosure relates to a scintillation detector and system including a scintillation crystal having a surface and a reflector surrounding at least a portion of the scintillation crystal. The reflector includes an organic substrate and an inorganic material fixed to the organic substrate, wherein at least a portion of the inorganic material contacts at least a portion of the crystal surface.

BACKGROUND

Scintillation detectors may be utilized for assessing or measuring radiation, including, for example, gamma rays, low and high energy X-rays, electrons, positrons and neutrons. Scintillation detectors may be used in a number of applications including well logging in the oil and gas industry to various medical applications such as positron emission tomography (PET) scanning and cobalt treatments. Generally, the detectors may include a crystal, which converts the energy of radiation to a light pulse. The light pulse may then be detected by a photomultiplier or other photodetector, which then converts the light pulses to electrical signals.

SUMMARY OF THE INVENTION

An aspect of the present disclosure relates to a scintillation detector. The scintillation detector may include a scintillation crystal having a surface and a reflector surrounding at least a portion of the scintillation crystal. The reflector may include an organic substrate and an inorganic material fixed to the organic substrate, wherein at least a portion of the inorganic material contacts at least a portion of the crystal surface.

Another aspect of the present disclosure relates to a method for forming a scintillation detector. At least a portion of a scintillation crystal is contacted with a reflector, wherein the reflector includes an organic substrate and an inorganic material fixed to the organic substrate, wherein at least a portion of the inorganic material contacts at least a portion of the crystal.

Yet another aspect of the present disclosure relates to a scintillation detection system. The system may include a scintillation crystal having a surface and a reflector surrounding at least a portion of the scintillation crystal. The reflector may include an organic substrate and an inorganic material fixed to the organic substrate, wherein at least a portion of the inorganic material contacts at least a portion of the crystal surface. The system may also include a photodetector in optical communication with the crystal and an analyzer in electrical communication with the photodetector.

An additional aspect of the present disclosure relates to a medical device including a scintillation crystal including a surface and a reflector surrounding at least a portion of the scintillation crystal. The reflector may include an organic substrate and an inorganic material fixed to the organic substrate, wherein at least a portion of the inorganic material contacts at least a portion of the crystal surface. The medical device may include a positron emission tomography (PET) scanner, a gamma camera, or a computed tomography (CT) scanner.

A further aspect of the present disclosure relates to a well logging detector including a scintillation crystal having a surface and a reflector surrounding at least a portion of the scintillation crystal. The reflector may include an organic substrate and an inorganic material fixed to the organic substrate, wherein at least a portion of the inorganic material contacts at least a portion of the crystal surface.

Yet a further aspect of the present disclosure relates to an inspection apparatus including a scintillation crystal having a surface and a reflector surrounding at least a portion of the scintillation crystal. The reflector may include an organic substrate and an inorganic material fixed to the organic substrate, wherein at least a portion of the inorganic material contacts at least a portion of the crystal surface. The inspection apparatus may include a thermal neutron activation analysis detector, luggage scanner, thickness gauge, liquid level gauge, passive security and manifest verification, active security and manifest verification, active spectroscopy, passive spectroscopy, active gross counters and passive gross counters.

An additional aspect of the present disclosure relates to a research device including a scintillation crystal having a surface and a reflector surrounding at least a portion of the scintillation crystal. The reflector may include an organic substrate and an inorganic material fixed to the organic substrate, wherein at least a portion of the inorganic material contacts at least a portion of the crystal surface. The research device may include a spectrometer or calorimeter.

BRIEF DESCRIPTION OF THE DRAWINGS

The above-mentioned and other features of this disclosure, and the manner of attaining them, may become more apparent and better understood by reference to the following description of embodiments described herein taken in conjunction with the accompanying drawings, wherein:

FIG. 3a is a cross-sectional view of an example of a reflector;

FIG. 3b illustrates a cross-sectional view of another example of a reflector;

DETAILED DESCRIPTION

Figure 1:
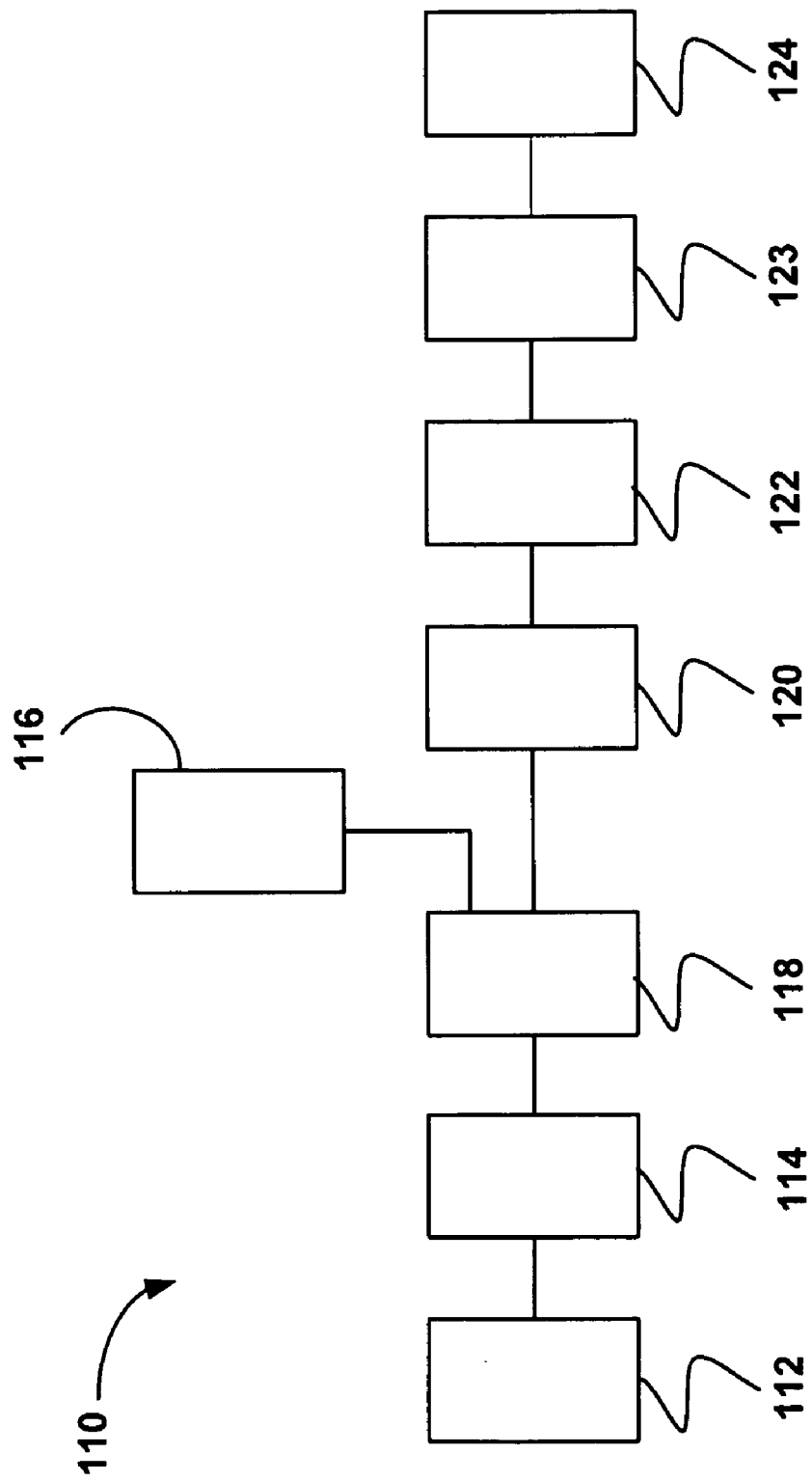
FIG. 1 is an example of a scintillation detection system.

It is to be understood that this disclosure is not limited in its application to the details of construction and the arrangement of components set forth in the following description or illustrated in the drawings. The embodiments herein are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The present disclosure relates to a reflector for use within a scintillation detector. As noted above, a scintillation detector may be used to assess or measure radiation by converting the energy of the radiation into light pulses or photons. The radiation may be electromagnetic, i.e., in the form of waves or photons, such as gamma rays, low and high energy X-rays, etc. The radiation may also be particle radiation, i.e., in the form of sub-atomic particles, including electrons, positrons or neutrons. To prevent the loss of light within a detector, the detector may include a reflector, which surrounds at least a portion of the scintillation crystal. The reflector may reflect light emitted by the crystal back into the crystal. The crystal may itself be relatively transparent to the emitted light, so that such light may be detected by a photodetector in optical communication with the crystal. As may be appreciated, preventing such losses in the scintillation detector may provide more accurate assessments or measurements of radiation.

An example of a scintillation detection system is illustrated in FIG. 1. The detector 110 may include a scintillation crystal 112, which may absorb radiation and scintillate or emit a portion of the absorbed energy as photons. Examples of relatively common scintillation crystals may include thallium doped sodium iodide (NaI(tl)) or thallium doped cesium iodide (CsI(tl)). Additional examples of scintillation crystals may include barium fluoride, cerium-doped lanthanum chloride ($LaCl_3$(ce)), bismuth germinate ($Bi_4Ge_3O_{12}$), cerium-doped yttrium aluminum garnet (Ce:YAG), cerium-doped lanthanum bromide ($LaBr_3$(ce)), lutetium iodide ($LuI_3$), terbium-doped gadolinium oxysulfide (GOS(tb)), calcium tungstate ($CaWO_4$), cadmium tungstate ($CdWO_4$), lead tungstate ($PbWO_4$), zinc tungstate ($ZnWO_4$) or lutetium oxyorthosilicate ($Lu_2SiO_5$). The emitted photons may then be detected by a photodetector 114, which is in optical communication with the crystal.

In one example, the photodetector 114 may be a photomultiplier tube (PMT). As photons emitted from the crystal strike a photocathode within the photomultiplier tube, electrons may be generated producing a signal representative of the incident radiation absorbed by the scintillation crystal. The photomultiplier 114 may be biased by a high voltage power supply 116, which connects to a voltage divider 118. The voltage divider 118 may divide the high voltage into a series of steps to accelerate the electrons from one photomultiplier stage to the next. The photomultiplier may multiply or amplify the signal produced by at least a few orders of magnitude, such as in the range of $10^2$ to $10^8$. Other photodetectors 114 may include photodiodes or charge-coupled devices. The signal provided by the photodetector 114 may then be processed by a pre-amplifier 120 and an amplifier 122, an analog to digital converter 123 and then by a multi-channel analyzer 124 to which the photodetector 114 may be in electrical communication. In one example, the pre-amplifier may amplify or increase the signal received from the photodetector and the amplifier may shape or filter the signal received from the pre-amplifier. However, it may be appreciated that other arrangements may be utilized herein as well.

Figure 2:
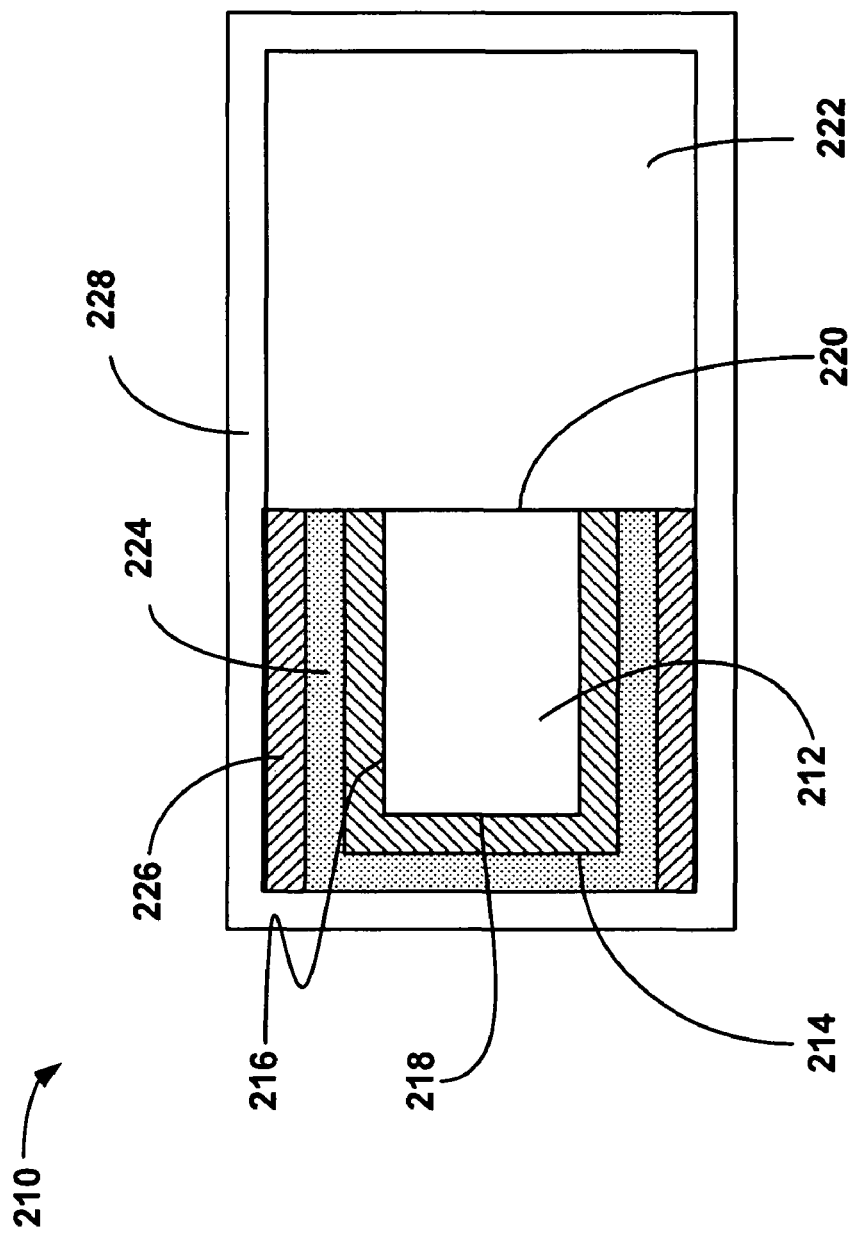
FIG. 2 is an example of a scintillation detector.

An example of a scintillation detector 210 is illustrated in FIG. 2. To prevent the loss of light emitted from the scintillation crystal, at least a portion of the scintillation crystal 212 may be covered, wrapped, other otherwise coated in a reflective material 214. The reflective material 214 may reflect at least a portion of the light emitted by the scintillation crystal 212 back into the crystal. As illustrated, the crystal is cylindrical in shape; however, other crystal geometries may be used as well. In one example, the reflective material may be positioned, for example, around the circumferential surface 216 of the crystal and the bottom surface 218 of the crystal, leaving a portion of the crystal 220 exposed such that it may be configured to optically communicate with the photodetector 222.

As illustrated in FIG. 3a, the reflective material 310 may include an organic substrate 312 coated with an inorganic material 314. The crystal, being relatively transparent at wavelengths in the bandwidth of the emitted light, may then transmit the light to the photodetector. As illustrated, there appears to be a relatively distinct boundary 316 between the organic substrate 312 and the inorganic material 314. It may be appreciated however that the inorganic material 314 may intermingle with the organic substrate 312 and the boundary between the materials may not be as distinct as illustrated in FIG. 3b. For example, where the inorganic material may be deposited on an organic substrate made of fabric, the inorganic material may be present between at least a portion of the fibers composing the fabric.

The organic substrate may include relatively low water absorption polymeric material. A polymeric material having a relatively low water absorption may be understood as a material exhibiting less than 0.1% water absorption, as measured by ASTM D570-98 (2005) over a 24 hour period, including all values and increments therein, such as 0.05% water absorption. In addition, the organic substrate may provide a moisture vapor or water vapor transmission of 35 $g/m^2d$ or less, as measured by ASTM E-96 (2005) including all values and increments therein, such as 0.1 to 10 $g/m^2d$. Where the organic substrate may be a fabric, the organic substrate may exhibit a bubble point, as measured manually with 100% IPA, in the range of 5 kilopascals to 350 kilopascals, including all values and increments therein, such as 125 kilopascals to 275 kilopascals.

In one example, the polymeric material may be a fluoropolymer, such as polytetrafluoroethylene (PTFE), fluorinated ethylene propylene (FEP), perfluoroalkoxy (PFA), or polyvinyl fluoride (PVF). However, other polymeric materials may be contemplated herein as well, such as polypropylene, polyethylene, polyester, etc. In addition, as alluded to above, the organic substrate may be formed of film, bi-axially oriented film, fabric or may be a solid geometry. In one example, the organic substrate may be formed from woven fabric, non-woven fabric or a membrane. The fabric may include one or more layers, wherein the individual layers may include fibers or yarns formed from a fluoropolymer or other materials such as polypropylene, polyester, aramids, polyphenylene sulfide, etc. In one example the organic substrate may include a porous PTFE based substrate such as TETRATEX, available from Donaldson, Co. of Minneapolis, Minn.

It may be appreciated that one or more layers of the organic substrate may be built up around the scintillation crystal by wrapping or otherwise depositing the polymer material onto the crystal surface. For example, where the organic substrate may be a film, which may be wrapped around the crystal two (2) or more times. In another example, the organic material may be provided as a solid geometry, such as a tube or puck and positioned around the crystal in a contacting manner. The organic substrate may have a thickness in the range of 1 μm to 1,000 μm, including all values and increments therein.

The inorganic material may be a metal oxide, carbide, nitride, boride or sulfide, wherein the inorganic material may reflect at least a portion of incident light at one or more wavelengths in the range of 200 nm to 600 nm, including all values and increments therein, such as 300 nm to 550 nm. In some examples, as illustrated in FIG. 3b, the inorganic material may have one or more facets 318, 320 forming the surface. It may be appreciated that the facets may be planar or arcuate including concave or convex. In some examples, at least a portion of the inorganic material may have one or more facets exposed on the reflector surface 322, such that at least 10% of the inorganic material may have one or more facets exposed on the reflector surface, including all values and increments in the range of 10% to 100%, including all values and increments therein, such as in the range of 50% to 75%, 40% to 80%, etc.

In one example, the inorganic material may be aluminum oxide, which may exhibit a gamma phase having a cubic crystalline system, an alpha phase exhibiting a hexagonal system, or a transitional phase between the gamma and alpha phases. The aluminum oxide may also exhibit a hardness of greater than 7, including all values and increments between 7 and 10, such as 8 or 9. In other examples, the inorganic material may be a pigment, such as a white pigment, capable of reflecting light emitted by the scintillation crystal. Such white pigments may include titanium dioxide, calcium carbonate, calcium sulphate, etc.

The inorganic material may be deposited onto the organic substrate and have a thickness in the range of 0.01 μm to 500 μm, including all values and increments therein. That is, stated another way, the inorganic material may be disposed or adhered onto the surface of the organic substrate in one or more layers, wherein the layers may be present on the organic substrate at a thickness in the range of 0.01 μm to 500 μm, including all values and increments therein. The inorganic material may also be provided as a powder or particles having an average particle size in the range of 0.01 μm to 50 μm across the largest particle dimension, including all values and increments therein. In some examples, the total thickness of the inorganic material and the organic substrate may be in the range of 1 μm to 1,000 μm, including all values and increments therein.

The inorganic material may be fixed to the organic substrate. To fix the inorganic material to the organic substrate, the inorganic materials may be either mechanically or chemically set into or adhered to the organic substrate. In some examples, the organic material may be embedded in the organic substrate. The organic substrate may surround a portion of the inorganic material particles. In some examples, the inorganic material may be disposed on the organic substrate and tamped, or otherwise pressed, into the substrate. Tamping may occur using an object having a relatively flat surface and contacting the object to the inorganic material disposed on the substrate. It may be appreciated that sufficient pressure may be used to lodge at least a portion of the inorganic material into the organic material.

In other examples, the inorganic material may be adhered to the organic substrate by depositing the inorganic material onto the organic substrate. Adhering the inorganic material to the organic substrate may be performed by chemical bonding, such as through the use of adhesives, or molecular bonding, such as through various atomic forces, to the organic substrate. The adhesive may be relatively transparent to the light emitted by the scintillation crystal. For example, at least 80% or more of the light may pass through the adhesive, including all values and increments in the range of 80% to 100%, such as 95% to 100%.

The inorganic material may also be deposited and adhered to the surface of the organic substrate by physical or chemical vapor deposition techniques, including sputtering or evaporative variations of these techniques. Thus, for example, an aluminum oxide target may be provided from which atoms may be ejected or evaporated and applied to the surface of the organic substrate in an inert environment. In another example, an aluminum target may be provided from which atoms may be ejected or evaporated and applied to the surface of the organic substrate in an oxygenated environment, such that the aluminum is oxidized and forms an aluminum oxide layer on the surface of the organic substrate.

Referring back to FIG. 2, the scintillation crystal and reflector may optionally be covered or surrounded by an elastomeric material 224, such as a synthetic rubber or silicone. In addition, a sleeve 226, which may be formed of a number of materials, such as various polymeric materials or metals, may be positioned over the scintillation crystal 212 and/or the elastomeric material 224. The scintillation crystal assembly including the crystal 212, reflector 214 and optional elastomeric material 224 and sleeve 226 may be inserted into a casing 228. The casing may also include a photodetector 222 optically connected directly to the scintillation crystal 212. However, it may be appreciated that an optical window (not illustrated) may be provided to indirectly connect the scintillation crystal to a photodetector outside of the casing. Once the assembly has been completed, the casing may be hermetically sealed so as to prevent exposure of the scintillation crystal to water vapor or other environmental conditions, which may cause degradation to the scintillation crystal or other portions of the detector.

By providing the inorganic material on the organic substrate and wrapping the material about the crystal, the time to produce a detector may be reduced, as compared to, for example, packing the inorganic material between the crystal and casing and vibrating the inorganic material into place.

Figure 4:
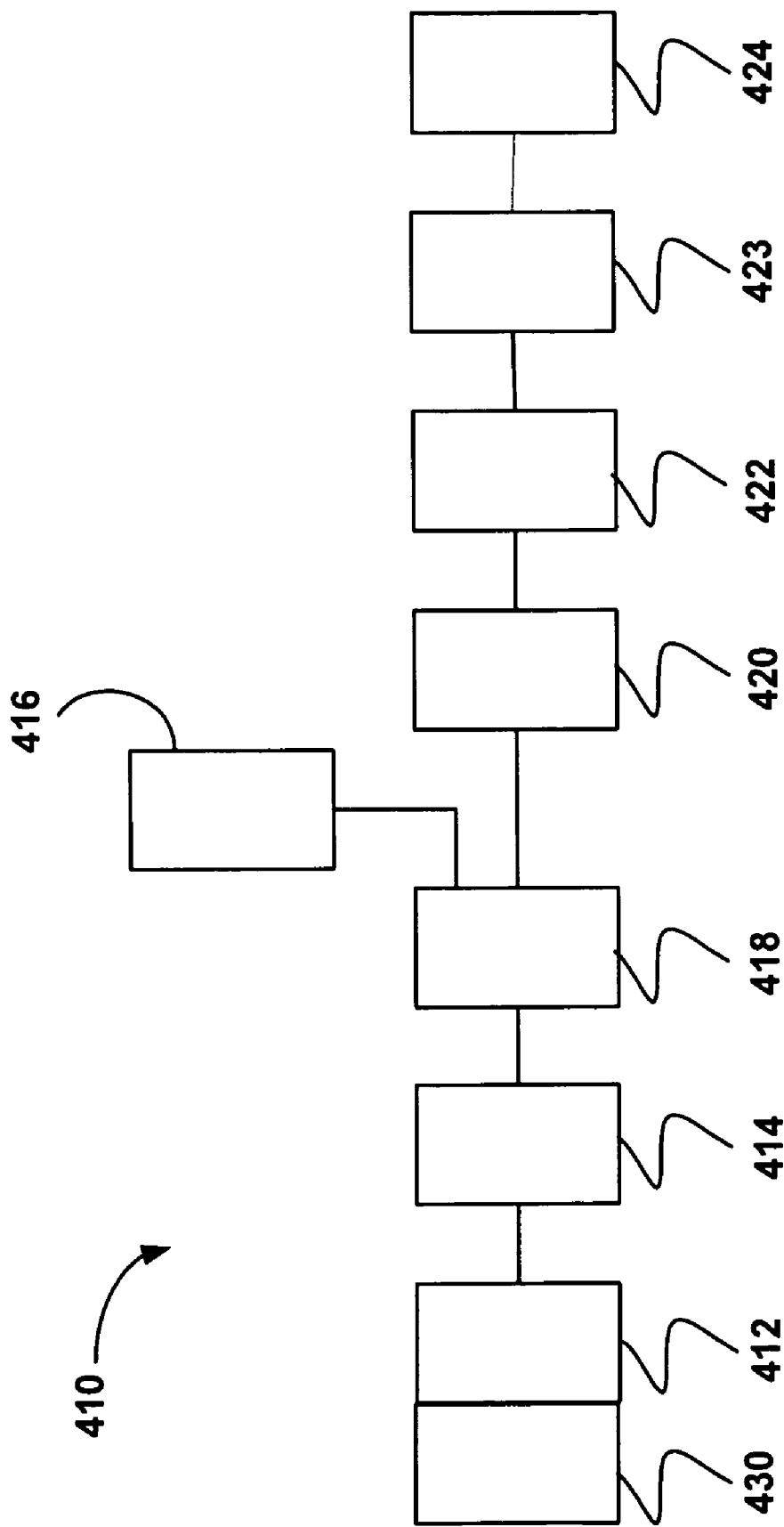
FIG. 4 is an example of an apparatus for measuring the resolution of different reflector materials.

In addition, the reflectors described herein may improve the resolution factor of a detector by 0.25% or more, including all values and increments therein, such as 3% to 15%, as compared to, for example, a reflector that includes a fluoropolymer in contact with the scintillation crystal. A determination of such increase in resolution may be measured, for example, by an apparatus illustrated in FIG. 4. The apparatus 410 may include a crystal 412, such as a NaI(tl) crystal exhibiting a wavelength of emission (max.) of 415 nm, in optical communication with a photomultiplier 414, which may turn light pulses received from the crystal into electrical pulses. The photomultiplier 414 may be biased by a high voltage power supply 416, which connects to a voltage divider 418. The voltage divider 418 may divide the high voltage into a series of steps to accelerate the electrons from one photomultiplier stage to the next. The photomultiplier may multiply or amplify the signal produced by at least a few orders of magnitude, such as in the range of $10^2$ to $10^8$. The signal provided by the photodetector 414 may then be processed by a pre-amplifier 420, an amplifier 422, an analog to digital converter 423 and then by a multi-channel analyzer 424 to which the photodetector 414 may be in electrical communication.

A sample of the reflector material 430 may be positioned in contact with the crystal 412. It may be appreciated that such an arrangement may account for factors such as the refractive index of the sample and crystal material and the effect of the emitted light re-entering the crystal 412 from the reflector material 430. Once the sample is loaded, the crystal may be irradiated or exposed to radiation of a given source, such as cesium 137, with a known quantity or energy of radiation for a given time period. The crystal 412 may then scintillate, wherein light pulses may be emitted by the crystal and reflected by the reflector sample 430 back into the crystal. The photomultiplier 414 may then receive the light pulses and provide electrical pulses representative of the light pulses.

The electrical pulses may be detected by the multi-channel analyzer 424 and the number of pulses having a given pulse height may be recorded and a histogram of the number of counts of pulses at a given pulse height or channel may be developed. At least 2,000 counts may be present at a peak pulse height in the histogram. The pulse height channel may be calibrated to a specific energy level depending on the radiation source used and other factors.

Figure 5:
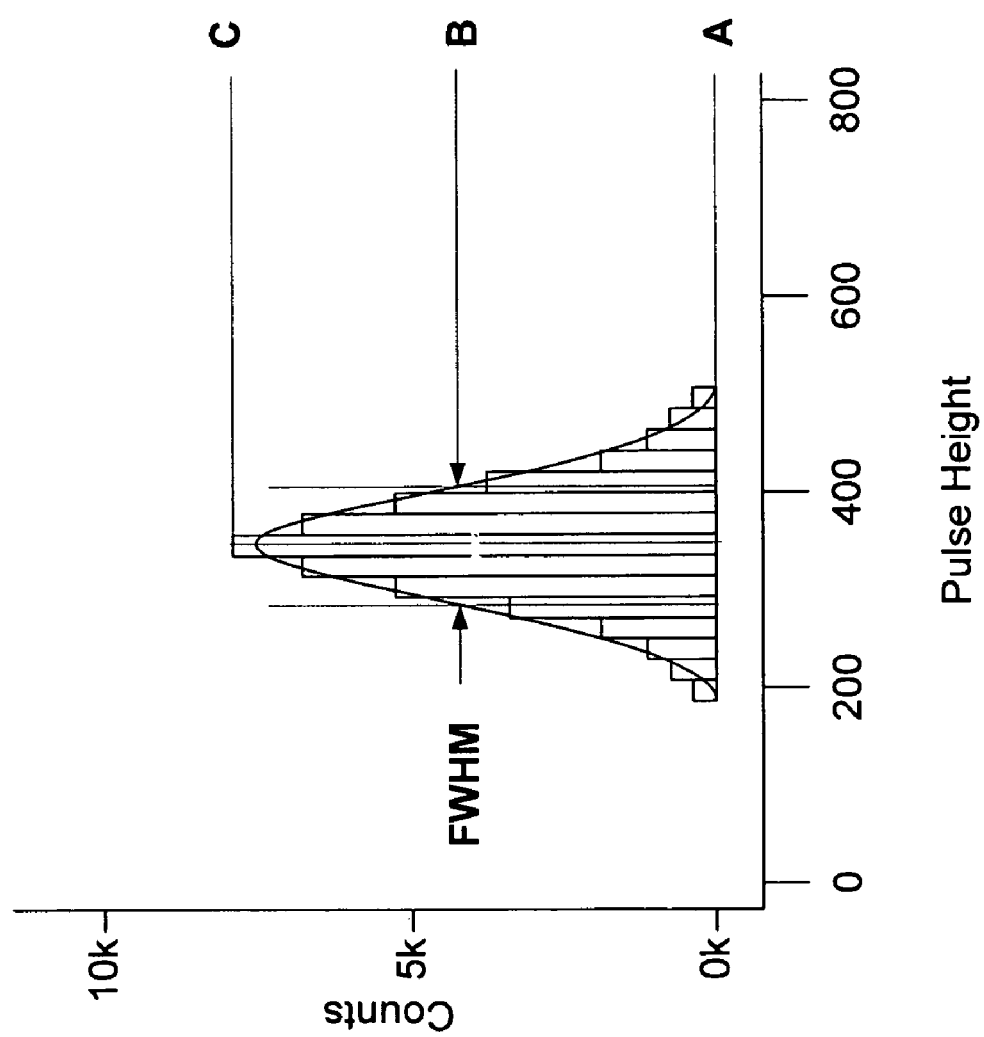
FIG. 5 is an example of a histogram produced by the apparatus of FIG. 4.

An example of a histogram is illustrated in FIG. 5. As can be seen in the histogram, the peak pulse height C may be understood as the pulse height channel providing the highest number of counts measured relative to the base line A. In addition, the number of channels present in the full width at the half maximum point B may be determined. The half maximum point B, may be understood as being halfway between the peak C and the baseline A. The centroid, i.e., the channel including the peak pulse height, and full width half maximum may be calculated by the least squares fit method. The data, i.e., the channel at the peak pulse height ($C_{PEAK}$), and the number of channels at full width half maximum ($N_{FWHM}$), may then be utilized to determine the performance of the detector and/or reflector, in terms of a resolution factor $F_R$, according to the following equation:

$$F_R = \frac{N_{FWHM}}{C_{PEAK}} * 100\%$$

It may be appreciated that the lower the number, the better the resolution as the distribution may be tighter, i.e., the number of channels at full width half maximum may be lower. Thus, the resolution factor may decrease or improve by 0.25% or more, such as 0.25% to 4.0% including all values and increments therein, as compared to, for example, a reflector that includes a fluoropolymer in contact with the scintillation crystal.

Furthermore, as measured using the techniques presented above, it may be appreciated that an enhancement in the peak pulse height channel may be observed. It may be appreciated that the peak pulse height channel may be indicative of light intensity and the greater the peak pulse height channel, the greater the light intensity detected. Thus, a detector including a reflector contemplated herein may exhibit a peak pulse height 0.25% greater, including all values and increments therein, such as 0.25% to 4%, 1%, 2%, etc., as compared to, for example, a reflector that includes a fluoropolymer in direct contact with the scintillation crystal.

The above reflector may be utilized in a variety of scintillation detectors. Reference is made herein to U.S. Pat. Nos. 5,869,836; 6,222,192; 6,359,282; and U.S. Patent Application No. 2007/0007460, the disclosures of which are incorporated herein by reference, which describe a number of scintillation detectors in which the reflector contemplated herein may be utilized. Furthermore, the scintillation detectors including the reflectors discussed herein may be employed in various applications and devices, including medical devices, geophysical devices, inspection devices, research devices and health physics applications. Medical devices may include positron emission tomography scanners, gamma cameras, computed tomography scanners and radioimmunoassay applications. Geophysical devices may include well logging detectors. Inspection devices may include radiance detectors, such as thermal neutron activation analysis detectors, luggage scanners, thickness gauges, liquid level gauges, security and manifest verification both active and passive, spectroscopy (radioisotope identification devices) both active and passive, and gross counters both active and passive. Research devices may include spectrometers and calorimeters. Health physics applications may include laundry monitoring and area monitoring.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A scintillation detector, comprising:
a scintillation crystal having a crystal surface; and
a reflector surrounding at least a portion of said scintillation crystal, wherein said reflector includes an organic substrate and a layer of inorganic material fixed to said organic substrate, wherein said layer of inorganic material contacts at least a portion of said crystal surface.

2. The scintillation detector of claim 1, wherein said reflector includes a reflector surface and said layer of inorganic material includes one or more facets, wherein at least a portion of said one or more facets of at least a portion of said layer of inorganic material is exposed at said reflector surface.

3. The scintillation detector of claim 1, wherein said organic substrate exhibits a moisture vapor transmission of 35 $g/m^2d$ or less as measured by ASTM E-96.

4. The scintillation detector of claim 1, wherein said detector exhibits a peak pulse height of at least 0.25% greater than a detector including a reflector consisting of said organic substrate.

5. The scintillation detector of claim 1, wherein said organic substrate comprises a fabric, wherein said fabric comprises fluoropolymer fibers.

6. The scintillation detector of claim 1, wherein said organic substrate has a thickness in the range of 1 μm to 1,000 μm.

7. The scintillation detector of claim 1, wherein said layer of inorganic material is selected from the group consisting of metal oxide, metal carbide, metal nitride, metal boride and metal sulfide, and reflects at least a portion of incident light at one or more wavelengths in the range of 200 nm to 600 nm.

8. The scintillation detector of claim 1, wherein said layer of inorganic material has a thickness in the range of 0.01 μm to 500 μm.

9. The scintillation detector of claim 1, wherein said scintillation crystal and said reflector are present in a medical device.

10. The scintillation detector of claim 9, wherein said medical device is selected from the group consisting of a positron emission tomography scanner, a gamma camera, and a computed tomography scanner.

11. The scintillation detector of claim 1, wherein said scintillation crystal and said reflector are present in a well logging detector.

12. The scintillation detector of claim 1, wherein said scintillation crystal and said reflector are present in an inspection apparatus.

13. The scintillation detector of claim 12, wherein said inspection apparatus is selected from the group consisting of a thermal neutron activation analysis detector, luggage scanner, thickness gauge, liquid level gauge, active security and manifest verification, passive security and manifest verification, active spectroscopy, passive spectroscopy, active gross counters and passive gross counters.

14. The scintillation detector of claim 1, wherein said scintillation crystal and said reflector are present in a research device.

15. The scintillation detector of claim 1, wherein said layer of inorganic material comprises substantial inorganic material.

16. A method of forming a scintillation detector, comprising:
contacting at least a portion of a scintillation crystal with a reflector, wherein said reflector includes an organic substrate and a layer of inorganic material fixed to said organic substrate, wherein said layer of inorganic material contacts at least a portion of said crystal surface.

17. The method of claim 16, wherein said reflector includes a reflector surface and said layer of inorganic material includes one or more facets, wherein at least a portion of said one or more facets of at least a portion of said layer of inorganic material is exposed at said reflector surface.

18. The method of claim 16, wherein said organic substrate exhibits a moisture vapor transmission of 35 g/m²d or less as measured by ASTM E-96.

19. The method of claim 16, wherein said organic substrate comprises a fluoropolymer.

20. The method of claim 16, wherein said organic substrate has a thickness in the range of 1 μm to 1,000 μm.

21. The method of claim 16, wherein said layer of inorganic material is selected from the group consisting of metal oxide, metal carbide, metal nitride, metal boride and metal sulfide, and reflects at least a portion of incident light at one or more wavelengths in the range of 200 nm to 600 nm.

22. The method of claim 16, wherein said layer of inorganic material has a thickness in the range of 0.01 μm to 500 μm.

23. A scintillation detection system, comprising:
a scintillation crystal having a surface; and
a reflector surrounding at least a portion of said scintillation crystal, wherein said reflector includes an organic substrate and a layer of inorganic material adhered to said organic substrate, wherein said layer of inorganic material coats at least a portion of said crystal surface;
a photodetector in optical communication with said scintillation crystal; and
an analyzer in electrical communication with said photodetector.

24. The scintillation detection system of claim 23, wherein said reflector includes a reflector surface and said layer of inorganic material includes one or more facets, wherein at least a portion of said one or more facets of at least a portion of said layer of inorganic material is exposed at said reflector surface.

25. A scintillation detector, comprising:
a scintillation crystal having a crystal surface; and
a reflector surrounding at least a portion of said scintillation crystal, wherein said reflector includes an organic substrate and an inorganic material fixed to said organic substrate, wherein at least a portion of said inorganic material contacts at least a portion of said crystal surface and said organic substrate comprises a fabric, wherein said fabric comprises fluoropolymer.

26. A method of forming a scintillation detector, comprising:
contacting at least a portion of a scintillation crystal with a reflector, wherein said reflector includes an organic substrate and an inorganic material fixed to said organic substrate, wherein at least a portion of said inorganic material contacts at least a portion of said crystal surface and wherein said organic substrate comprises a fluoropolymer.

* * * * *